United States Patent
Kim et al.

(10) Patent No.: US 11,593,006 B2
(45) Date of Patent: Feb. 28, 2023

(54) DATA STORAGE APPARATUS AND METHOD FOR MANAGING VALID DATA BASED ON BITMAP TABLE

(71) Applicant: SK hynix Inc., Gyeonggi-do (KR)

(72) Inventors: Jin Pyo Kim, Gyeonggi-do (KR); Ji Hoon Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 9 days.

(21) Appl. No.: 17/240,374

(22) Filed: Apr. 26, 2021

(65) Prior Publication Data

US 2022/0179573 A1    Jun. 9, 2022

(30) Foreign Application Priority Data

Dec. 7, 2020    (KR) .......................... 10-2020-0169201

(51) Int. Cl.
*G06F 3/06*    (2006.01)

(52) U.S. Cl.
CPC .......... *G06F 3/0638* (2013.01); *G06F 3/0604* (2013.01); *G06F 3/0659* (2013.01); *G06F 3/0688* (2013.01)

(58) Field of Classification Search
CPC .... G06F 3/0638; G06F 3/0604; G06F 3/0688; G06F 3/0656
See application file for complete search history.

(56) References Cited

U.S. PATENT DOCUMENTS

| | | | |
|---|---|---|---|
| 2011/0191528 A1* | 8/2011 | Suzuki | G06F 12/02 711/E12.008 |
| 2012/0002895 A1* | 1/2012 | Blum | H03M 7/30 382/251 |
| 2015/0324284 A1* | 11/2015 | Kim | G06F 12/02 711/103 |
| 2018/0267897 A1* | 9/2018 | Jeong | G06F 12/0802 |
| 2018/0286477 A1* | 10/2018 | Chiu | G11C 11/5628 |
| 2019/0163621 A1* | 5/2019 | Doh | G06F 12/0246 |
| 2020/0142821 A1* | 5/2020 | Cui | G06F 12/0873 |
| 2021/0141557 A1* | 5/2021 | Yuen | G06F 12/0253 |

FOREIGN PATENT DOCUMENTS

| | | |
|---|---|---|
| KR | 10-1533744 B1 | 7/2015 |
| KR | 10-2018-0104830 A | 9/2018 |

* cited by examiner

*Primary Examiner* — Tracy A Warren
(74) *Attorney, Agent, or Firm* — IP & T Group LLP

(57) ABSTRACT

A data storage apparatus includes a storage including a plurality of planes, which include a plurality of pages, and a controller configured to control the storage to read data by grouping the plurality of pages as a page group in an interleaving unit, manage pages in which valid data are stored, among the plurality of pages, as a first bitmap table, and manage a second bitmap table generated by compressing the first bitmap table in a page group unit.

13 Claims, 11 Drawing Sheets

DATA STORAGE APPARATUS AND METHOD FOR MANAGING VALID DATA BASED ON BITMAP TABLE

CROSS-REFERENCES TO RELATED APPLICATION

The present application claims priority under 35 U.S.C. § 119(a) to Korean Patent Application Number 10-2020-0169201, filed on Dec. 7, 2020, which is incorporated herein by reference in its entirety.

BACKGROUND

1. Technical Field

Various embodiments may generally relate to a semiconductor integrated device, and more particularly, to a data storage apparatus and an operating method thereof.

2. Related Art

Data storage devices perform a data input/output operation using volatile memory devices or nonvolatile memory devices as storage media in response to a request of a host device.

Examples of a data storage medium are storage devices using flash memory devices. With the increase in capacity and improvement in price competitiveness due to technological advancement of the flash memory devices, data centers which process large amounts of data may also employ storage devices using the flash memory devices, in addition to personal computers (PCs) or mobile devices.

Flash memory devices may not perform overwrite or in-place updating, and may have a read/write unit and an erase unit different from each other. Accordingly, the flash memory devices have to process requests of host devices by mapping logical addresses provided with read/write requests of the host devices to physical addresses.

House-keeping techniques for efficiently using storage spaces of flash memory devices, such as wear-leveling, garbage collection, and read reclaim, have been proposed.

Wear-leveling refers to a technique that a program-erase operation is distributed to as many blocks as possible.

Garbage collection refers to a technique for ensuring an empty block which can store user data by collecting and programming data of valid pages scattered in a source block to and in a target block and erasing the source block.

Read reclaim refers to a technique which moves data of a page at risk of disturbance to a page of another block.

Such house-keeping operations may cause an internal copy operation and thus address mapping information may be changed. Accordingly, it is necessary to efficiently manage the address mapping information.

SUMMARY

In an embodiment of the present disclosure, a data storage apparatus may include: a storage including a plurality of planes, which include a plurality of pages; and a controller configured to control the storage to read data by grouping the plurality of pages as a page group in an interleaving unit, manage pages in which valid data are stored, among the plurality of pages, as a first bitmap table, and manage a second bitmap table generated by compressing the first bitmap table in a page group unit.

In an embodiment of the present disclosure, a data storage apparatus may include: a storage including a plurality of planes, which include a plurality of pages; and a controller configured to control the storage to read data by grouping the plurality of pages in an interleaving unit. The controller is configured to constitute pages in which valid data are stored, among the plurality of pages, as a first bitmap table and constitute a second bitmap table by compressing the first bitmap table in a page group unit. The controller is configured to perform an internal management operation by detecting a position of a valid page in a valid page group, which is detected based on the second bitmap table, from the first bitmap table.

In an embodiment of the present disclosure, an operating method of a data storage apparatus which includes a storage including a plurality of planes, which include a plurality of pages and a controller configured to control the storage. The method comprising: controlling, by the controller, the storage to read data by grouping the plurality of pages as a page group in an interleaving unit; constituting, by the controller, pages in which valid data are stored, among the plurality of pages, as a first bitmap table; and constituting, by the controller, a second bitmap table by compressing the first bitmap table in a page group unit.

In an embodiment of the present disclosure, an operating method of a data storage apparatus which includes a storage including a plurality of dies, each die including a plurality of planes, each plane including a plurality of pages; and a controller coupled to the storage. The controller is configured to generate multiple page groups, each page group including pages with the same number in the plurality of planes; control the storage to read data of the multiple page groups; generate a valid page bitmap indicating whether each page of each of the multiple page groups includes valid or invalid data based on the read results; generate a multi-plane page bitmap indicating whether each of the multiple page groups includes one or more valid pages; and move, to a target page, data in at least one valid page using the multi-plane page bitmap.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIG. 3 is a diagram illustrating a configuration of a first bitmap table according to an embodiment of the present disclosure.

FIG. 4 is a diagram illustrating a configuration of a second bitmap table according to an embodiment of the present disclosure.

DETAILED DESCRIPTION

Various embodiments of the present teachings are described in detail with reference to the accompanying drawings. The drawings are schematic illustrations of various embodiments and intermediate structures. As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present teachings as defined in the appended claims.

The present teachings are described herein with reference to cross-section and/or plan illustrations of embodiments of the present teachings. However, embodiments of the present teachings should not be construed as limiting the present teachings. Although a few embodiments of the present teachings are shown and described, it will be appreciated by those of ordinary skill in the art that changes may be made in these embodiments without departing from the principles and spirit of the present teachings.

Figure 1:
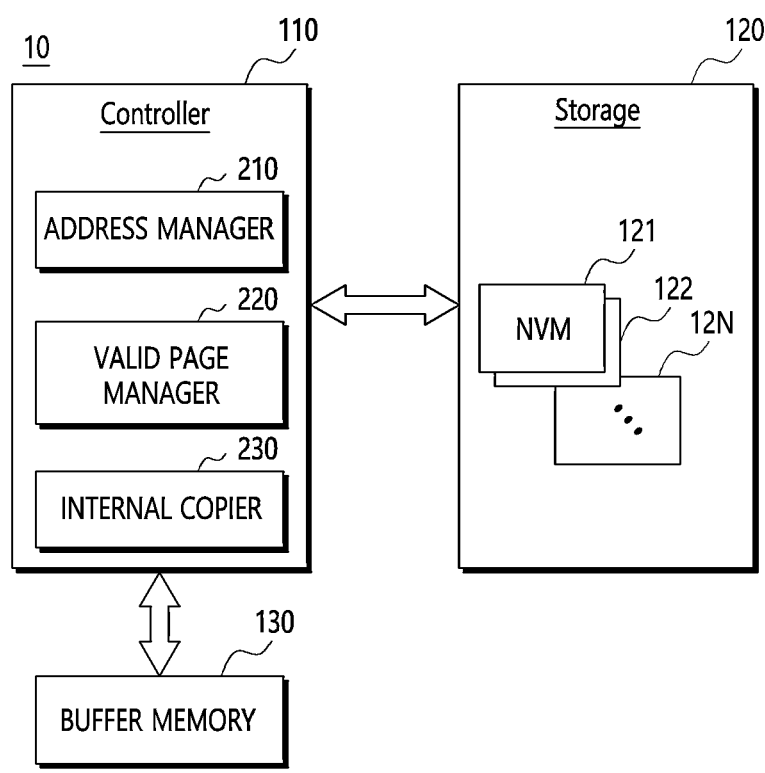
FIG. 1 is a diagram illustrating a configuration of a data storage apparatus according to an embodiment of the present disclosure.

FIG. 1 is a diagram illustrating a configuration of a data storage apparatus 10 according to an embodiment of the present disclosure.

Referring to FIG. 1, the data storage apparatus 10 may include a controller 110, storage 120, and a buffer memory 130.

The controller 110 may control the storage 120 in response to a request of a host device (not shown). For example, the controller 110 may control data to be programmed in the storage 120 in response to a write request of the host device. The controller 110 may provide data written in the storage 120 to the host device in response to a read request of the host device.

The storage 120 may program data therein or output data programmed therein according to control of the controller 110. The storage 120 may be configured of a volatile memory device or a nonvolatile memory device. In an embodiment, the storage 120 may be implemented using a memory device selected among various nonvolatile memory devices such as an electrically erasable and programmable read only memory (EEPROM), a NAND flash memory, a NOR flash memory, a phase-change random access memory (PRAM), a resistive RAM (ReRAM), a ferroelectric RAM (FRAM), a spin torque transfer magnetic RAM (STT-MRAM), and the like.

The storage 120 may include a plurality of nonvolatile memory devices (NVMs) 121 to 12N, and each of the nonvolatile memory devices 121 to 12N may include a plurality of dies, a plurality of chips, or a plurality of packages. Each of the plurality of dies may include at least one plane and each of planes may include a plurality of memory blocks. Each of the plurality of memory blocks may include a plurality of pages.

Further, the storage 120 may include a single-level cell (SLC) in which one-bit data is to be stored in one memory cell or an extra-level cell (XLC) in which multi-bit data is to be stored in one memory cell.

The buffer memory 130 may serve as a space which may temporarily store data to be transmitted and received when the data storage apparatus 10 performs a series of operations such as an operation of reading or writing data in connection with the host device. Although it has been illustrated in FIG. 1 that the buffer memory 130 is located in the outside of the controller 110, the buffer memory 130 may be located in the inside of the controller 110.

Figure 2:
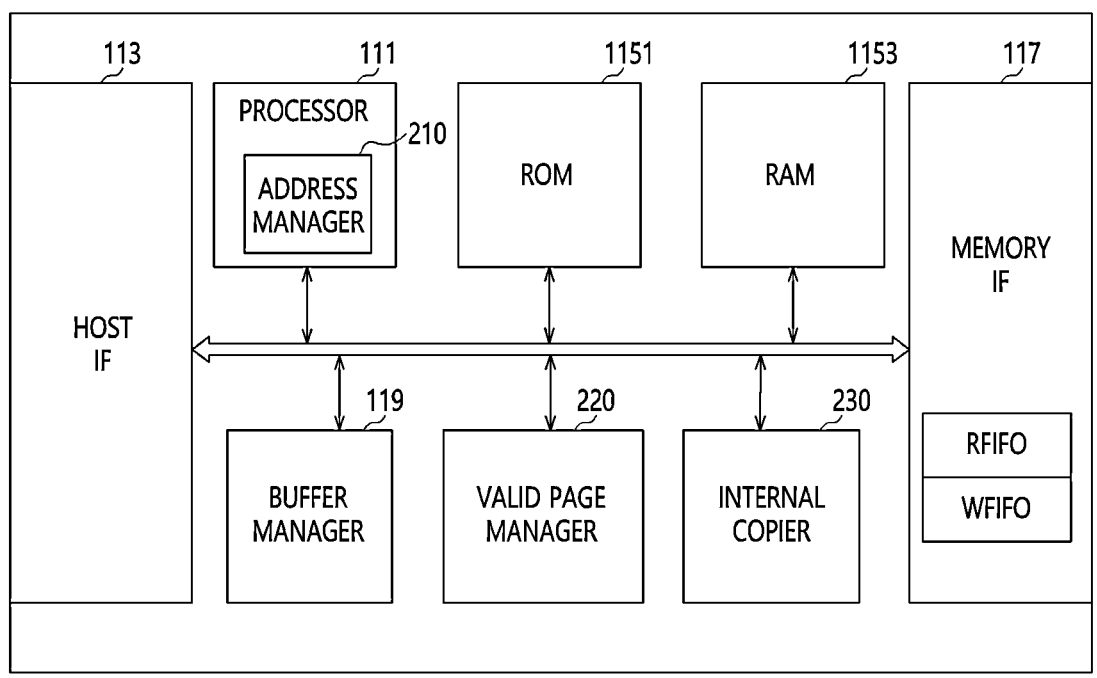
FIG. 2 is a diagram illustrating a configuration of a controller according to an embodiment of the present disclosure.

The buffer memory 130 may be controlled through a buffer manager (e.g., a buffer manager 119 of FIG. 2).

In some embodiments, the buffer manager 119 may divide the buffer memory 130 into a plurality of regions (or slots) and allocate and release the regions to temporarily store data. The allocation of the region may refer to a state that data is stored in the corresponding region or a state that data stored in the corresponding region is valid. The release of the region may refer to a state that data is not stored in the corresponding region or a state that data stored in the corresponding region is invalidated.

The controller 110 may include an address manger 210, a valid page manger 220, and an internal copier 230.

The address manager 210 may generate and change mapping information between a logical address and a physical address in response to a write request of the host device and an internal management operation of the controller 110 performed in a background. The mapping information may be stored in a specific region of the storage 120, for example, a meta region.

As the mapping information stored in the meta region of the storage 120 is provided to the controller 110 in driving of the data storage apparatus 10, the controller 110 may manage a memory operation for the storage 120 by referring to the address mapping information.

In the storage 120 which cannot perform overwrite or in-place updating, and has a read/write unit and an erase unit different from each other, data updating may be requested by the host device or data may be internally moved through the internal management operation of the controller 110. The moved or updated data may be valid data and the data which has been stored in the original region may be invalid data. Accordingly, the valid data and the invalid data may be mixed in the storage 120.

Figure 3:
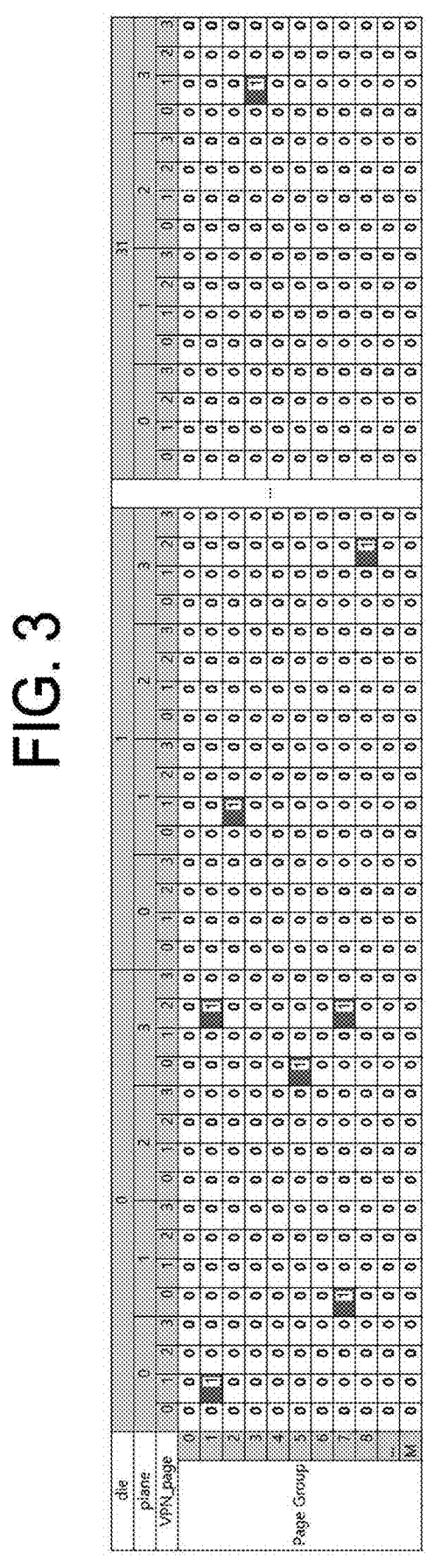

The address manager 210 may mange information related to a storage position of valid data as a bitmap table (e.g., a first bitmap table in FIG. 3). The first bitmap table may be generated and managed with respect to each of dies in the storage 120, but this is not limited thereto.

Each die of the storage 120 may be configured of a plurality of memory blocks including a plurality of pages and a plurality of planes including the plurality of blocks. The controller 110 may control the storage 120 to program data by grouping the plurality of pages in interleaving units.

For example, pages having the same address offset as each other or pages having different address offsets from each other in the planes of each die may be grouped in interleaving units to constitute a page group, and the storage 120 may read or write data in page group units.

Figure 4:
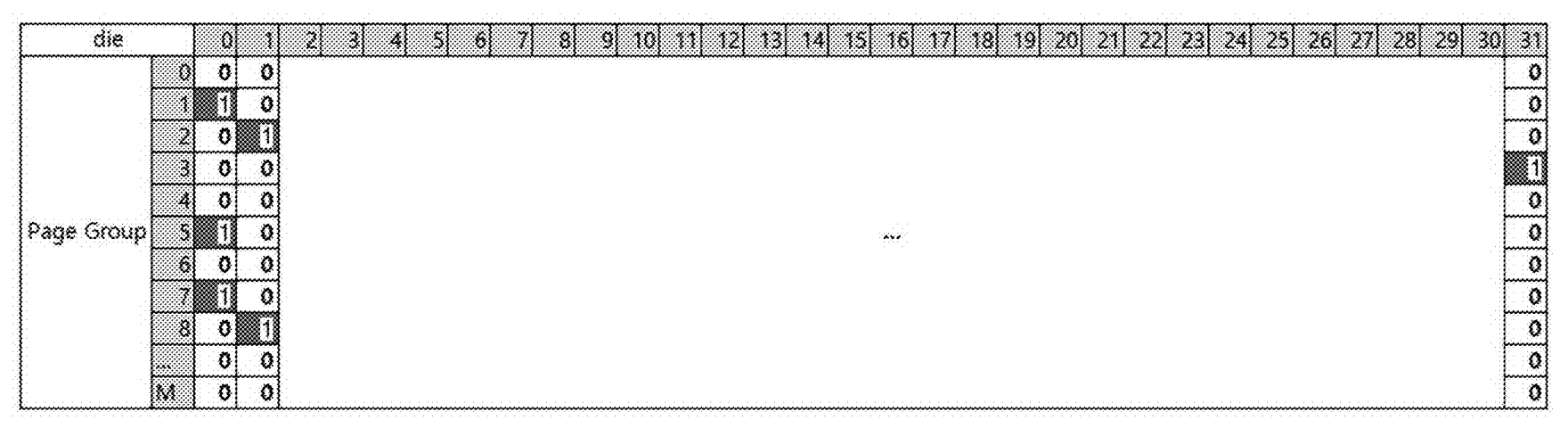

For example, the address manager 210 may generate a second bitmap table by compressing bitmap data in the first bitmap table in page group units or in interleaving units. In another example, the address manager 210 may generate the second bitmap table by compressing the bitmap data in the first bitmap table in multi-plane read units as shown in FIG. 4.

As an event triggering the internal copy occurs, the valid page manager 220 may detect at least one page group set to a set bit value as a valid page group by referring to the second bitmap table and control the storage 120 to read data of the detected valid page group. The valid page manager 220 may detect a position of a valid page set to a set bit value by accessing the first bitmap table corresponding to the detected valid page group.

The internal copier 230 may perform an internal copy operation which moves data of a valid source page to a target page. After the internal copy operation is performed, the data of the source page may be invalidated. In particular, according to an embodiment of the present technology, as the position of the valid page is detected in the valid page manager 220, the internal copier 230 may move data stored in the position of the valid page among data read from the valid page group to the target page.

A garbage collection operation may refer to an example of the internal copy operation.

For the garbage collection operation, the storage position of the valid data existing in the source block has to be identified. The first bitmap table may be configured for the whole pages, and thus the first bitmap table may have a size proportional to capacity of the storage 120. As described above, the read operation on the storage 120 may be performed in page group units, and when the second bitmap table is configured by compressing the bitmap data by a size (i.e., page group) read at a time, the page group including the valid page may be easily detected.

After data of the detected valid page group are read from the storage 120, when a page in which the valid data is stored is detected based on the first bitmap table, only the valid data among the data of the page group read at a time may be selected and then moved to the target page.

Accordingly, the valid page may be searched for at high speed without a process of scanning the entire first bitmap, and thus the internal management operation may be performed at high speed.

In an embodiment, the first bitmap table may be stored in the buffer memory 130. The access to the buffer memory 130 for scanning the first bitmap table may cause the operation performance of the controller 110 to be deteriorated. However, the present technology may search for the valid page group by preferentially accessing the second bitmap table having small capacity and then read the first bitmap table corresponding to the searched valid page group from the buffer memory 130. Accordingly, the access time and frequency to the buffer memory 130 may be reduced and the consistent performance of the controller 110 may be guaranteed.

The second bitmap table of which the size is reduced through compression of the first bitmap table may be stored in a working memory inside the controller 110, and thus the access time and frequency to the buffer memory 130 may be further reduced.

FIG. 2 is a configuration diagram of a controller 110 according to an embodiment of the present disclosure.

Referring to FIG. 2, the controller 110 may include a processor 111, a host interface (IF) 113, a read only memory (ROM) 1151, a random access memory (RAM) 1153, a memory interface (IF) 117, the buffer manager 119, the valid page manager 220, and the internal copier 230.

The processor 111 may be configured to transmit various control information required for a read or write operation of data from and to the storage 120 to the host interface 113, the RAM 1153, the buffer manager 119, and the memory interface 117. In an embodiment, the processor 111 may operate according to firmware provided for various operations of the data storage apparatus 10. In an embodiment, the processor 111 may perform a function of a flash translation layer (FTL) for managing the storage 120, such as garbage collection, address mapping, and wear-levelling, a function of detecting and correcting errors of data read out from the storage 120, and the like. In particular, the processor 111 may include the address manager 210 and generate and change mapping information between a logical address and a physical address in response to a write request of the host device or the internal management operation of the controller 110. Further, as the mapping information is changed, the address manager 210 may generate and update the first bitmap table and the second bitmap table that is generated by compressing the first bitmap table.

In an embodiment, the first bitmap table may be loaded into the buffer memory 130, and the second bitmap table may be loaded into the buffer memory 130 or the RAM 1153.

The host interface 113 may receive a command and a clock signal from the host device according to control of the processor 111 and provide a communication channel for controlling data input/output. In particular, the host interface 113 may provide a physical connection between the host device and the data storage apparatus 10. The host interface 113 may provide interfacing between the data storage apparatus 10 and the host device according to a bus format of the host device. The bus format of the host device may include at least one among standard interface protocols such as a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI-express (PCI-e or PCIe) protocol, and a universal flash storage (UFS) protocol.

Program codes, for example, firmware or software required for an operation of the controller 110 may be stored in the ROM 1151. Code data and the like used by the program codes may also be stored in the ROM 1151.

The RAM 1153 may store data required for an operation of the controller 110 or data generated by the controller 110.

The memory interface 117 may provide a communication channel for signal transmission and reception between the controller 110 and the storage 120. The memory interface 117 may write data temporarily stored in the buffer memory 130 in the storage 120 according to control of the processor 111. The memory interface 117 may provide and temporarily store data read out from the storage 120 to and in the buffer memory 130.

The memory interface 117 may include a read buffer RFIFO and a write buffer WFIFO. The read buffer RFIFO may temporarily store data read out from the storage 120 in a read operation. The write buffer RFIFO may temporarily store write data transmitted from the buffer memory 130 in a write operation. The write buffer WFIFO may also be used as a region to which data of a valid page among data stored in the read buffer RFIFO is copied in an internal copy operation.

The buffer manager 119 may be configured to manage a usage status of the buffer memory 130. In an embodiment, the buffer manager 119 may divide the buffer memory 130 into a plurality of regions (or slots) and allocate or release the regions to temporarily store data.

As an event which triggers an internal copy occurs, the valid page manager 220 may detect at least one page group set to a set bit value as a valid page group by referring to the second bitmap table and control the storage 120 to read data of the detected valid page group.

FIG. 3 is a configuration diagram of a first bit map table according to an embodiment of the present disclosure.

In the illustrated example of FIG. 3, each of dies Die 0 to Die 31 of the storage 120 may include a plurality of planes Plane 0 to Plane 3, and each of the planes may include a plurality of pages.

The valid page manager 220 may constitute information indicating whether or not data, which are stored in physical addresses corresponding to logical pages VPN_page for each logical page group LPG, are valid as the first bitmap table. For example, as bitmap data, a bit value of the first bitmap table may be represented as a logical value of 1 when the data is valid data and a bit value of the first bitmap table may be represented as a logical value of 0 when the data is invalid data, but this is not limited thereto.

Referring to FIG. 3, bitmap data of pages constituting the logical page group LPG1 (i.e., page group 1) of the die Die 0 may be represented as "0100/0000/0000/0010". The bitmap data means that only data stored in the second page (i.e., VPN_page 1) of the plane 0 in LPG1 of Die 0 and data stored in the third page (i.e., VPN_page 2) of the plane 3 in LPG1 of Die 0 is valid.

The valid page manager 220 may detect a position of a valid page set to a set bit value by accessing the first bitmap table corresponding to the detected valid page group.

FIG. 4 is a configuration diagram of a second bitmap table according to an embodiment of the present disclosure.

It can be seen from FIG. 4 that the first bitmap table is compressed as logical page groups LPG of each die. Since the logical page group LPG1 of the die Die 0 described above includes the valid page, the bitmap data of the logical page group in the second bitmap table may be set as a logical value of 1.

As described above, the second bitmap table may be generated as 1-bit bitmap data for each page group, and thus a size of the first bitmap table may be compressed to a size inversely proportional to the number of pages in the page group.

FIGS. 3 and 4 show an example that each page group includes 16 pages and the second bitmap table is compressed to 1/16.

Referring back to FIG. 2, the internal copier 230 may perform the internal copy operation which moves data of a valid source page to a target page. Specifically, as the position of the valid page is detected in the valid page manager 220, the internal copier 230 may move data stored in the position of the valid page among the data read from the valid page group to the target page. After the internal copy operation is performed, the data of the source page may be invalidated.

Figure 5:
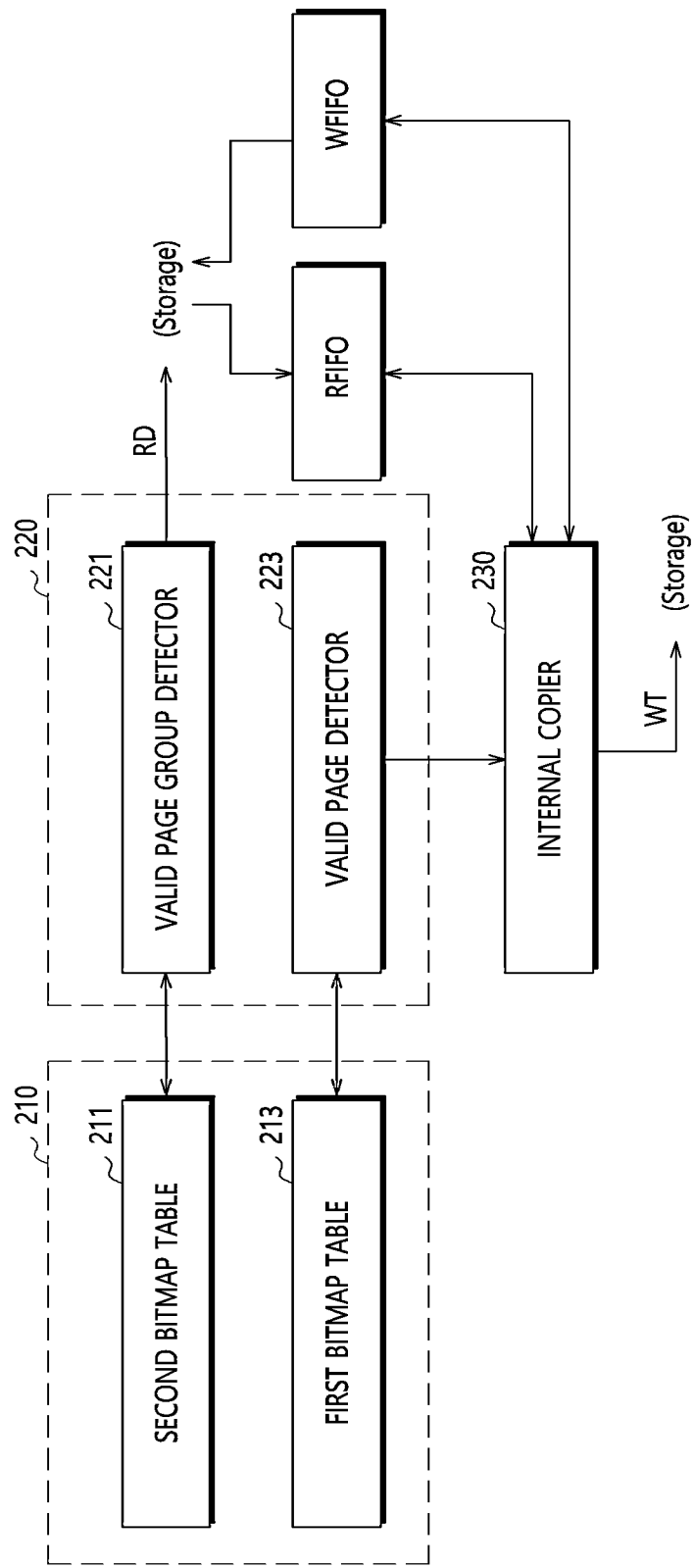
FIG. 5 is a diagram illustrating a configuration of a controller according to an embodiment of the present disclosure.

FIG. 5 is a configuration diagram of a controller according to an embodiment of the present disclosure.

Referring to FIG. 5, as an event triggering the internal copy occurs, a valid page group detector 221 of the valid page manager 220 may detect at least one page group set to a set bit value (e.g., a value of 1) as the valid page group by referring to a second bitmap table 211 generated in the address manager 210. Further, the valid page group detector 221 may control the storage 120 to read data from a physical page group corresponding to the detected valid page group (RD).

Accordingly, the data of the page group read from the storage 120 may be stored in the read buffer RFIFO.

The valid page detector 223 of the valid page manager 220 may detect a position of a valid page set to a set bit value (e.g., a value of 1) by accessing the first bitmap table 213 corresponding to the valid page group detected in the valid page group detector 223.

The internal copier 230 may receive the position of the valid page from the valid page detector 223 and store data of the position of the valid page among the data stored in the read buffer RFIFO in the write buffer WFIFO. The internal copier 230 may control the storage 120 to program data stored in the write buffer WFIFO in a target page (WT).

Figure 6:
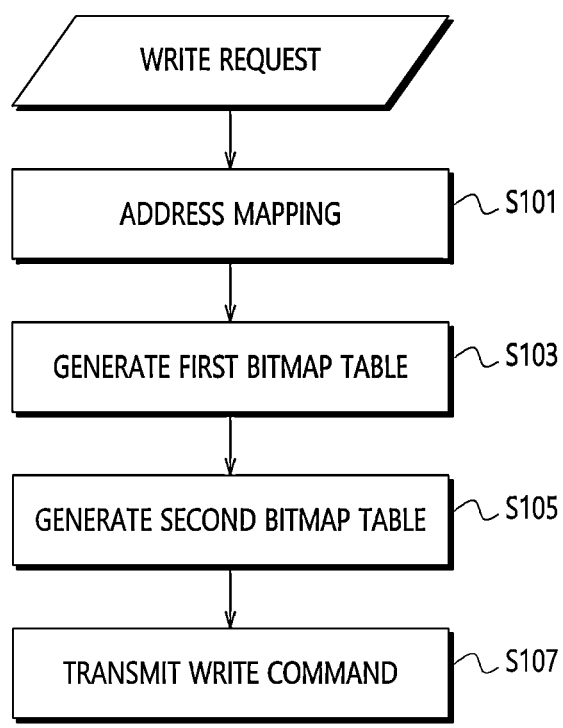
FIG. 6 is a flowchart illustrating an operating method of a data storage apparatus according to an embodiment of the present disclosure.

FIG. 6 is a flowchart illustrating an operating method of a data storage apparatus according to an embodiment of the present disclosure. That is, FIG. 6 illustrates a write operation processing method.

Referring to FIG. 6, when a write request is received from a host device, the controller 110 may map a logical address in the write request of the host device to a physical address (S101).

The write request may be a write request of new data or an update request of existing data. The first bitmap table which stores valid page information may be generated or updated according to the write request (S103). The first bitmap table may be loaded into the buffer memory 130 to be used and updated, and the first bitmap table may be stored in the storage 120.

For example, the controller 110 may generate the second bitmap table by compressing bitmap data of the first bitmap table in page group units or in interleaving units. In another example, the controller 110 may generate the second bitmap table by compressing the bitmap data of the first bitmap table in multi-plane read units. The second bitmap table may be loaded to the buffer memory 130 or the RAM 1153 to be used and updated, and the second bitmap table may be stored in the storage 120.

Then, the controller 110 may transmit write data from the host device and a physical address mapped in the address mapping process (S101) to the storage 120 such that the write data is written in the storage 120 (S107).

Even when data is internally moved through the internal management operation of the controller 110, the address mapping process (S101), the first bitmap table updating process (S103), and the second bitmap table updating process (S105) may be performed as described above.

Figure 7:
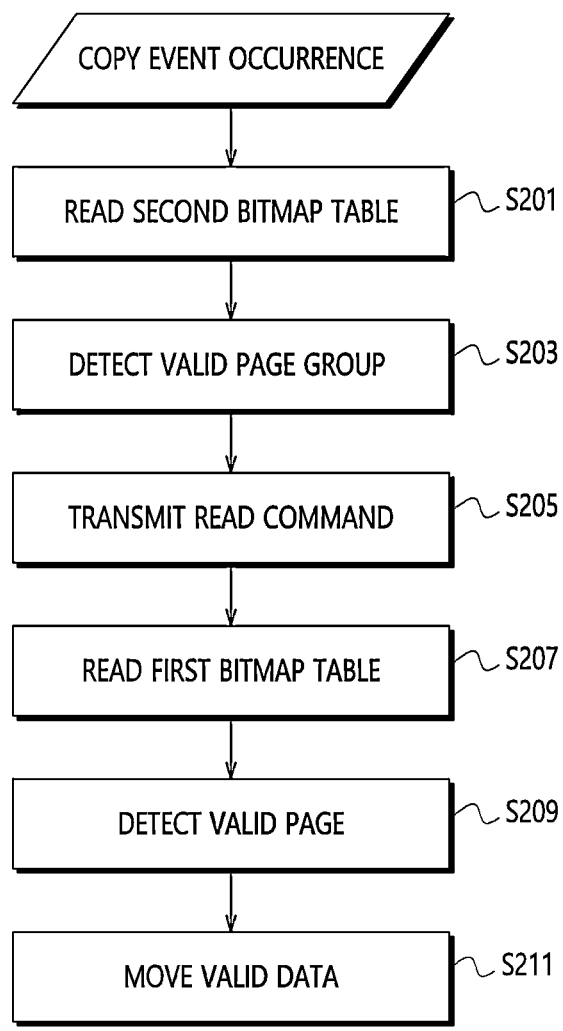
FIG. 7 is a flowchart illustrating an operating method of a data storage apparatus according to an embodiment of the present disclosure.

FIG. 7 is a flowchart illustrating an operating method of a data storage apparatus according to an embodiment of the present disclosure. That is, FIG. 7 illustrates an internal copy operation processing method.

Referring to FIG. 7, as an event triggering an internal copy occurs, the controller 110 may scan the second bitmap table (S201) and detect at least one page group set to a set bit value (e.g., a value of 1) as a valid page group (S203).

The controller 110 may control the storage 120 to read data from a physical page group corresponding to the detected valid page group (S205).

Accordingly, the data of the page group read from the storage 120 may be stored in the read buffer RFIFO.

The controller 110 may read and scan the first bitmap table corresponding to the valid page group detected in operation S203 (S207), and detect a position of a valid page set to a set bit value (S209).

Based on the position of the valid page detected in operation S207, the controller 110 may store (or move) data of the valid page position among the data stored in the read buffer RFIFO in the write buffer WFIFO and then control the storage 120 to program the data in a target page (S211).

Each die of the storage 120 may be configured of a plurality of memory blocks including a plurality of pages and a plurality of planes including a plurality of blocks. The controller 110 may constitute a page group by grouping pages having the same address offset as each other or pages having different address offsets from each other from the planes of each die in interleaving units and control the storage 120 to read or write data in page group units.

Accordingly, the controller 110 may search for a page group including at least one valid page by preferentially scanning a bitmap table that the valid page groups are compressed in page group units, for example, the second bitmap table. Subsequently, the controller 110 may specify a position of the valid page by referring to the first bitmap table corresponding to the searched valid page group.

Accordingly, the controller 110 may search for data of the valid page at high speed in response to an internal copy event and move the searched data to a target page.

Figure 8:
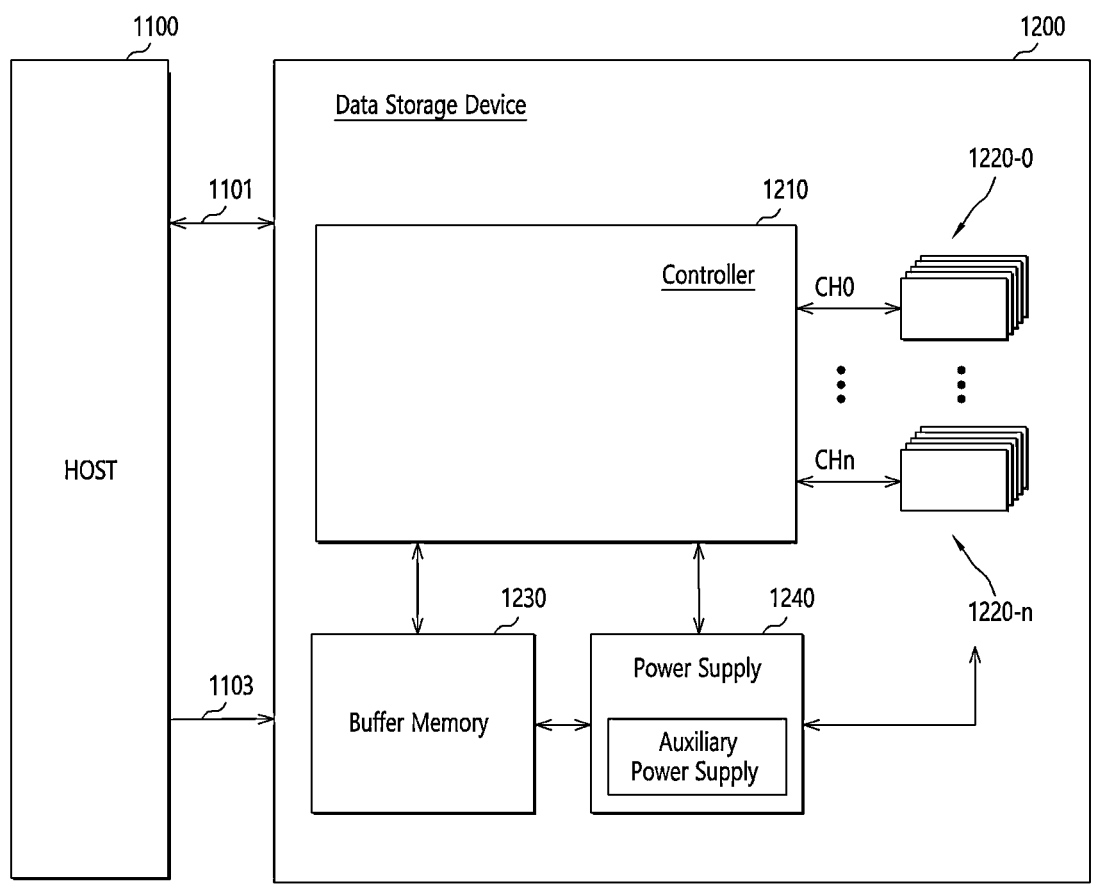
FIG. 8 is a diagram illustrating a data storage system in accordance with an embodiment.

FIG. 8 is a diagram illustrating a data storage system 1000 in accordance with an embodiment.

Referring to FIG. 8, the data storage system 1000 may include a host device 1100 and a data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may be configured as the controller 110 shown in FIGS. 1 and 2.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 9:
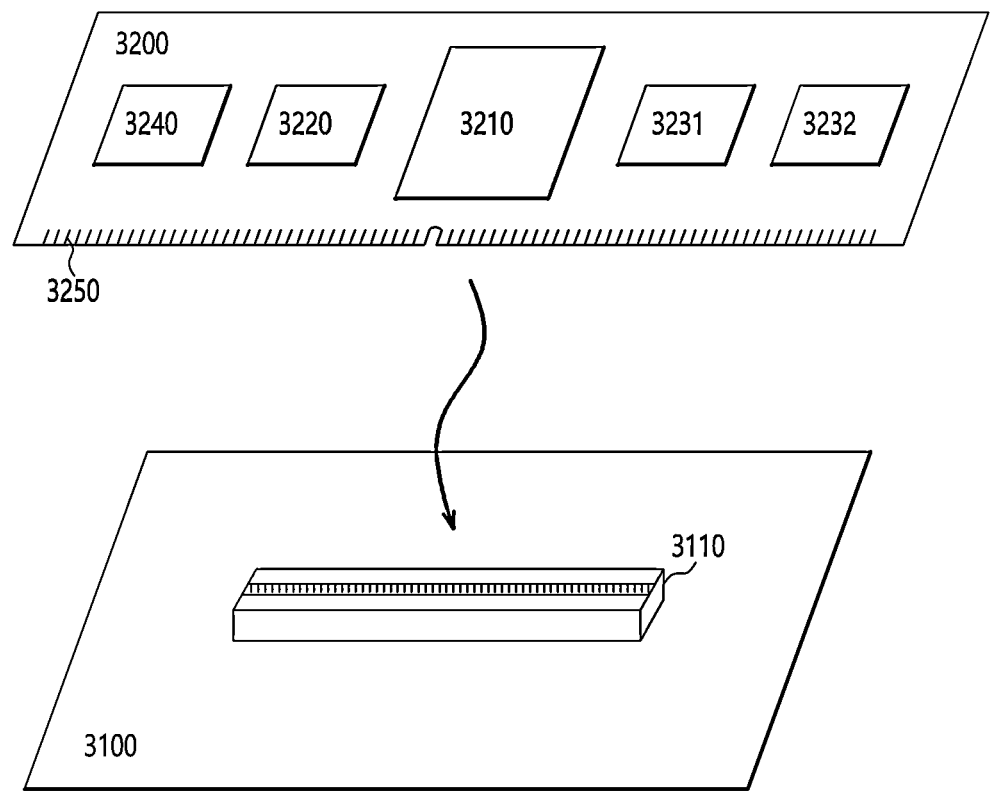
FIGS. 9 and 10 are diagrams illustrating a data processing system in accordance with an embodiment.

FIG. 9 is a diagram illustrating a data processing system 3000 in accordance with an embodiment. Referring to FIG. 9, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 10:
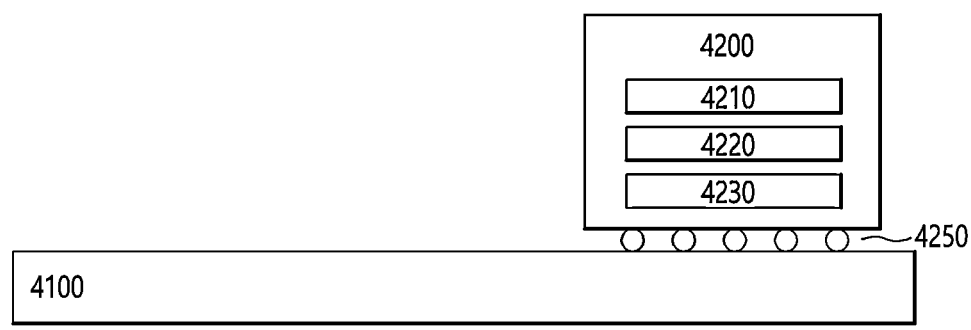

FIG. 10 is a diagram illustrating a data processing system 4000 in accordance with an embodiment. Referring to FIG.

10, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 11:
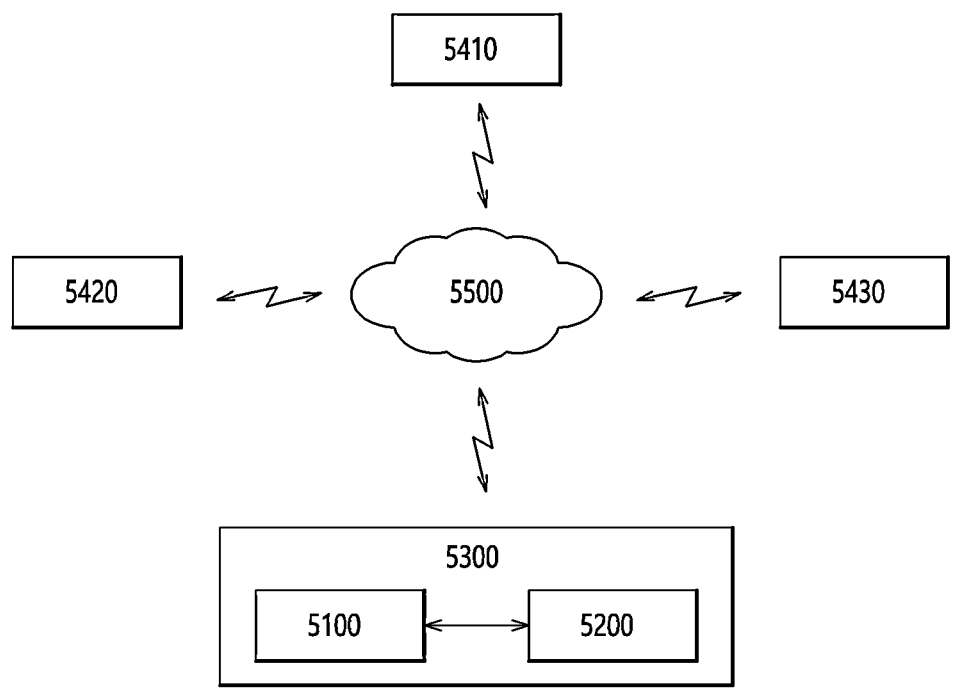
FIG. 11 is a diagram illustrating a network system including a data storage device in accordance with an embodiment.

FIG. 11 is a diagram illustrating a network system 5000 including a data storage device in accordance with an embodiment. Referring to FIG. 11, the network system 5000 may include a server system 5300 and a plurality of client systems 5410, 5420, and 5430, which are coupled through a network 5500.

The server system 5300 may serve data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the data storage apparatus 10 shown in FIG. 1, the data storage device 1200 shown in FIG. 8, the memory system 3200 shown in FIG. 9, or the memory system 4200 shown in FIG. 10.

Figure 12:
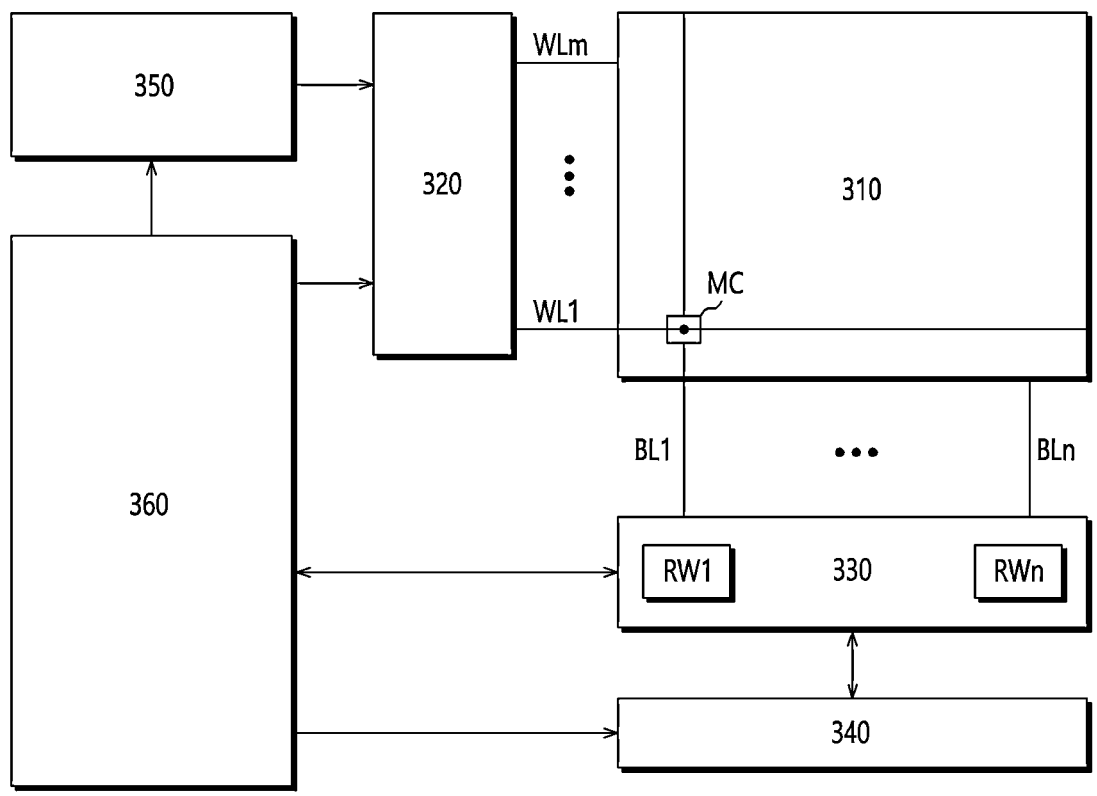
FIG. 12 is a block diagram illustrating a nonvolatile memory device in a data storage device in accordance with an embodiment.

FIG. 12 is a block diagram illustrating a nonvolatile memory device 300 included in a data storage device, such as the data storage apparatus 10, in accordance with an embodiment. Referring to FIG. 12, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure in a perpendicular direction to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array, memory cells are arranged in the horizontal and vertical directions with respect to the surface of the semiconductor substrate. The memory cells may be variously spaced to provide different degrees of integration The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications which are apparent in view of the present disclosure are intended to fall within the scope of the appended claims.

What is claimed is:

1. A data storage apparatus comprising:
   a storage including a plurality of planes, which include a plurality of pages; and a controller configured to control the storage to read data by grouping the plurality of pages as a page group in an interleaving unit, manage pages in which valid data are stored, among the plurality of pages, as a first bitmap table, and manage a second bitmap table generated by compressing the first bitmap table in a page group unit, wherein the controller includes:

a valid page group detector configured to detect at least one page group set to a set bit value as a valid page group by referring to the second bitmap table in response to an internal copy event and read data of the detected valid page group from the storage to store the read data of the detected valid page group in a first buffer;

a valid page detector configured to detect at least one valid page set to a set bit value by referring to the first bitmap table among data stored in the first buffer; and an internal copier configured to store data of the detected valid page in a second buffer and control the storage to program data stored in the second buffer to a target page.

2. The data storage apparatus of claim 1, wherein the page group is grouped by selecting pages having the same address offset as each other or pages having different address offsets from each other from the plurality of planes.

3. The data storage apparatus of claim 1, wherein the page group is a unit for accessing the storage in a read operation.

4. The data storage apparatus of claim 1, further comprising a buffer memory configured to store the first bitmap table, wherein the buffer memory is provided inside or outside the controller.

5. The data storage apparatus of claim 1, further comprising a working memory configured to store the second bitmap table, wherein the working memory is provided inside the controller.

6. A data storage apparatus comprising:

a storage including a plurality of planes, which include a plurality of pages; and a controller configured to control the storage to read data by grouping the plurality of pages in an interleaving unit, wherein the controller is configured to constitute pages in which valid data are stored, among the plurality of pages, as a first bitmap table and constitute a second bitmap table by compressing the first bitmap table in a page group unit, and wherein the controller is configured to perform an internal management operation by detecting a position of a valid page in a valid page group, which is detected based on the second bitmap table, from the first bitmap table, wherein the controller includes:

a valid page group detector configured to detect the valid page group by referring to the second bitmap table in response to an internal copy event and read data of the detected valid page group from the storage to store the read data of the detected valid page group in a first buffer;

a valid page detector configured to detect the valid page by referring to the first bitmap table among data stored in the first buffer; and an internal copier configured to store data of the detected valid page in a second buffer and control the storage to program data stored in the second buffer to a target page.

7. The data storage apparatus of claim 6, wherein the internal management operation includes at least one of wear-leveling, garbage collection, and read reclaim.

8. An operating method of a data storage apparatus which includes a storage including a plurality of planes, which include a plurality of pages and a controller configured to control the storage, the method comprising:

controlling, by the controller, the storage to read data by grouping the plurality of pages as a page group in an interleaving unit;

constituting, by the controller, pages in which valid data are stored, among the plurality of pages, as a first bitmap table; and constituting, by the controller, a second bitmap table by compressing the first bitmap table in a page group unit, detecting, by the controller, at least one page group set to a set bit value as a valid page group by referring to the second bitmap table in response to an internal copy event;

reading, by the controller, data of the detected valid page group from the storage and storing the read data of the detected valid page group in a first buffer;

detecting, by the controller, at least one page set to a set bit value by referring to the first bitmap table among data stored in the first buffer; and storing, by the controller, data of the detected valid page in a second buffer and controlling the storage to program data stored in the second buffer to a target page.

9. The method of claim 8, wherein the page group is grouped by selecting pages having the same address offset as each other or pages having different address offsets from each other from the plurality of planes.

10. The method of claim 8, wherein the page group is a unit for accessing the storage in a read operation.

11. The method of claim 8, further comprising storing, by the controller, the first bitmap table in a buffer memory which is provided inside or outside the controller.

12. The method of claim 8, further comprising storing, by the controller, the second bitmap table in a working memory which is provided inside the controller.

13. A data storage apparatus comprising:

a storage including a plurality of dies, each die including a plurality of planes, each plane including a plurality of pages; and a controller coupled to the storage and configured to:

generate multiple page groups, each page group including pages with the same number in the plurality of planes;

control the storage to read data of the multiple page groups;

generate a valid page bitmap indicating whether each page of each of the multiple page groups includes valid or invalid data based on the read results;

generate a multi-plane page bitmap indicating whether each of the multiple page groups includes one or more valid pages; and move, to a target page, data in at least one valid page using the multi-plane page bitmap, wherein the controller includes:

a valid page group detector configured to detect at least one multiple page group as a valid page group by referring to the multi-plane page bitmap and read data of the detected valid page group from the storage to store the read data of the detected valid page group in a first buffer;

a valid page detector configured to detect the valid page by referring to the valid page bitmap among data stored in the first buffer; and an internal copier configured to store data of the detected valid page in a second buffer and control the storage to program data stored in the second buffer to the target page.

\* \* \* \* \*